Aug. 14, 1934.  L. W. HOTTEL  1,970,171
MOLDING PRESS
Filed Dec. 30, 1932
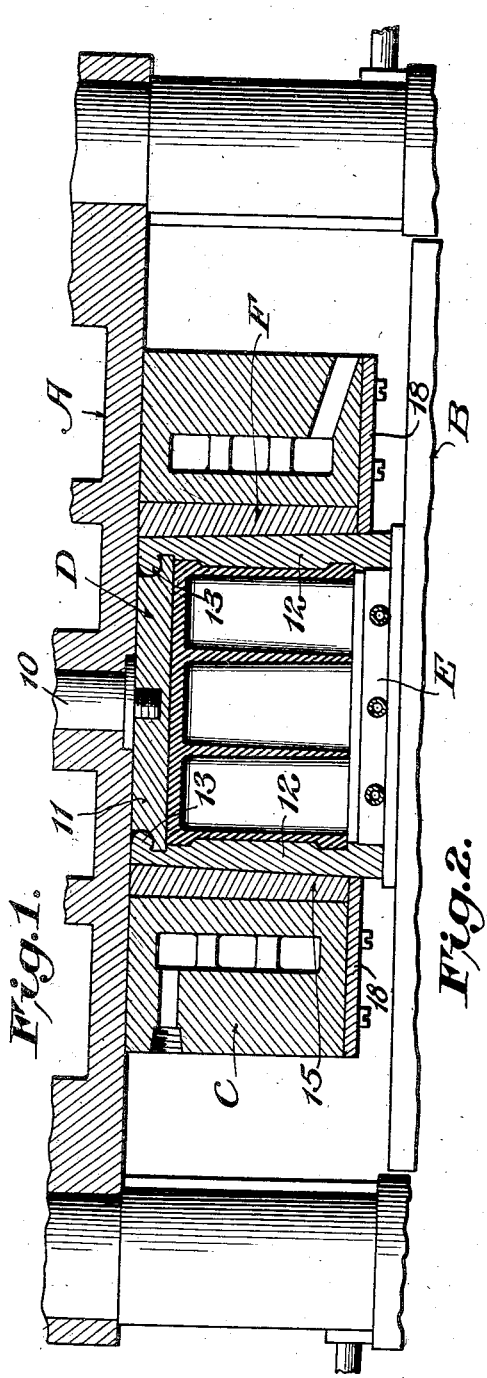
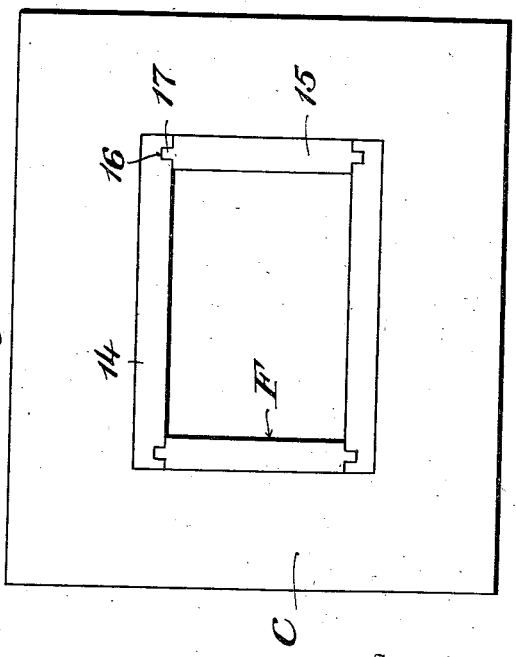
Inventor
Louis W. Hottel,
By D. P. Wolhaupter
Attorney

UNITED STATES PATENT OFFICE 1,970,171

MOLDING PRESS

Louis W. Hottel, Indianapolis, Ind.

Application December 30, 1932, Serial No. 649,659

2 Claims. (Cl. 18—19)

This invention relates to molding presses such as are employed for forming hollow plastic articles, and has generally in view to provide certain desirable improvements in molding presses of the general type described and claimed in my prior Patent No. 1,652,991; i. e., molding presses of the type including a mold chamber, a mold box, and a cooperating core.

In the use of a mold press of the general character disclosed in my aforesaid prior patent and wherein the mold box is inclusive of hinged sides to be swung outwardly to release the molded article, the mold box during forming of an article is moved into the mold chamber whereby its sides are held against outward movement, and the core is moved into the mold box to shape the article. High pressures are employed in the molding operation, and in practice it has been found that the bearing faces of the mold chamber soon become scored and otherwise marred and damaged by engagement therewith of the sides of the mold box under the high operating pressures. It has been found, moreover, that once scoring or marring of the bearing faces starts it develops rapidly, with consequent improper fitting of the mold box within the mold chamber and the forming of imperfect articles. When such a condition develops the only remedy according to present general practice is to renew the mold chamber which involves not only considerable expense, but necessitates that the press remain idle during the considerable time required to effect the renewal. Accordingly, the general object of the present invention is to provide a mold chamber embodying a practical construction whereby, in the event of scoring or marring of the bearing faces thereof, such faces may be renewed quickly and at relatively low cost.

Furthermore, the invention provides, through the use of mold box liner plates, a thoroughly effective and reliable means of utilizing different metals which afford a much better bearing surface for the plate assembly than if made of the same material as the plates. Ordinarily, the die box and mold plate assembly are made of steel, but with the present invention it is possible to make the die box of steel, as usual, and the liners of cast iron, bronze, or other material with the advantages set forth, and to also prevent "freezing" or sticking of the mold assembly to the sides of the die box.

With the foregoing general object in view, the invention consists in the novel features of construction, combination and arrangement of parts as will be hereinafter more fully described, illustrated in the accompanying drawing and defined in the appended claims.

In the drawing:—

Figure 1 is a sectional view through a portion of a mold press illustrating the improved mold chamber.

Figure 2 is an elevation illustrating the interfitting construction of the mold chamber facing elements; and Figure 3 is a detail sectional view illustrating an alternative embodiment of the invention.

The drawing illustrates only those essential parts of a mold press with which the improvements constituting the invention are directly concerned, the press head being designated generally as A and the platen as B.

Carried by the press head A is the mold chamber designated generally as C, while carried by a rod 10 which is slidable through the press head is the mold box, designated generally as D, which, through the instrumentality of the rod 10, is movable into and out of the mold chamber. The core, designated generally as E, is carried by the platen B and is movable by the platen into and out of the mold box.

The mold box D is of the type illustrated in my aforesaid prior patent and comprises a top plate 11 to which the rod 10 is secured, and side plates 12 hinged to said end plate, as at 13, for outward swinging, article releasing movement.

In the operation of the press to form an article the mold box is moved into the mold chamber whereby the side plates 12 of the mold box are embraced and held against outward swinging movement, and, with a body of plastic material interposed between the mold box and the core, the core is moved into the mold box to cause the material to conform in exterior shape to the interior shape of the mold box, and in interior shape to the interior shape of the core. The mold box then is withdrawn from the mold chamber, the core is withdrawn from the mold box, and the sides of the mold box are swung outwardly to release the formed article.

Accurate fitting of the mold box within the mold chamber is necessary in order to maintain tight joints at the meeting edges of the sides of the mold box, as otherwise the high pressure employed in forcing the core into the mold box will result in stretching or expanding of the mold box and consequent forcing of the plastic material between the meeting edges of the sides thereof.

As aforesaid, it has been found in practice that scoring or marring of the bearing faces of the mold chamber occurs as a result of movement of the mold box into and from the mold chamber, and that when such scoring or marring starts it develops rapidly, permitting relative outward movement of the sides of the mold box. Wear, too, occurs on the bearing faces of the mold chamber, and this also permits relative outward movement of the sides of the mold box.

According to the invention, in order to avoid the necessity of renewing the mold chamber when its bearing surfaces become no longer serviceable because of being scarred, marred or worn, said chamber is provided with a renewable lining designated generally as F.

The lining F may be formed in one piece and may be secured within the mold chamber in any suitable manner. Preferably, however, it is formed of separate side and end elements 14 and 15, respectively, the former of which have grooves 16 in their inner faces and the latter of which have end tongues 17 received by said grooves, as illustrated in Fig. 2, whereby they are held securely in unitary assembly when they are disposed within the mold chamber. To hold the lining within the mold chamber, simple means are provided comprising retaining plates 18 detachably fastened against the bottom of the mold chamber and overlying the bottom edges of the lining, as illustrated in Fig. 1, upward movement of the lining being prevented by engagement of its upper edges with the press head A.

Obviously, when the lining F is employed the bearing faces of the mold chamber are constituted by the inner faces of the lining, so that in the event of scoring, marring or excessive wear on said faces all that is necessary is to renew the lining, which may be done quickly and at only relatively minor expense. Moreover, by forming the lining of separate side and end elements, said elements may be individually renewed.

In Fig. 3 of the drawing is illustrated an embodiment of the invention which avoids the necessity of providing the lining retaining plates. According to this embodiment of the invention the side and end plates 14', 15' of the lining are provided at their upper ends with outwardly directed flanges 19 which are accommodated in channels 20 formed in the top of the mold chamber B'. The flanges obviously serve to prevent downward movement of the plates, while upward movement of said plates is prevented by engagement of their upper edges with the press head. The bottoms of the flanges 19 and also the walls defining the bottoms of the channels 20 are inclined downwardly and outwardly. Thus, when the lining plates 14', 15' are placed within the mold chamber they are urged outwardly by their weight and the cooperation between the inclined faces of their flanges 19 and the bottoms of the grooves 20 to their normal operative positions abutting the walls of the mold chamber, which positions they immediately assume and maintain.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. In a molding press, a mold chamber having a channel at the top thereof surrounding the chamber therein, the wall defining the bottom of said channel being inclined downwardly and outwardly, and a removable lining for said chamber having an outwardly directed flange disposed within said channel, the bottom face of said flange being inclined downwardly and outwardly for wedging cooperation with the inclined bottom wall of the groove.

2. In a molding press, a mold chamber having a channel at the top thereof surrounding the chamber therein, the wall defining the bottom of said channel being inclined downwardly and outwardly, and a removable lining for said chamber composed of separate side and end plates each having an outwardly directed flange disposed within said channel, the bottom faces of said flanges being inclined downwardly and outwardly for wedging cooperation with the inclined bottom wall of the groove, and said plates having interfitting tongue and groove formations.

LOUIS W. HOTTEL.